Patented June 8, 1926.

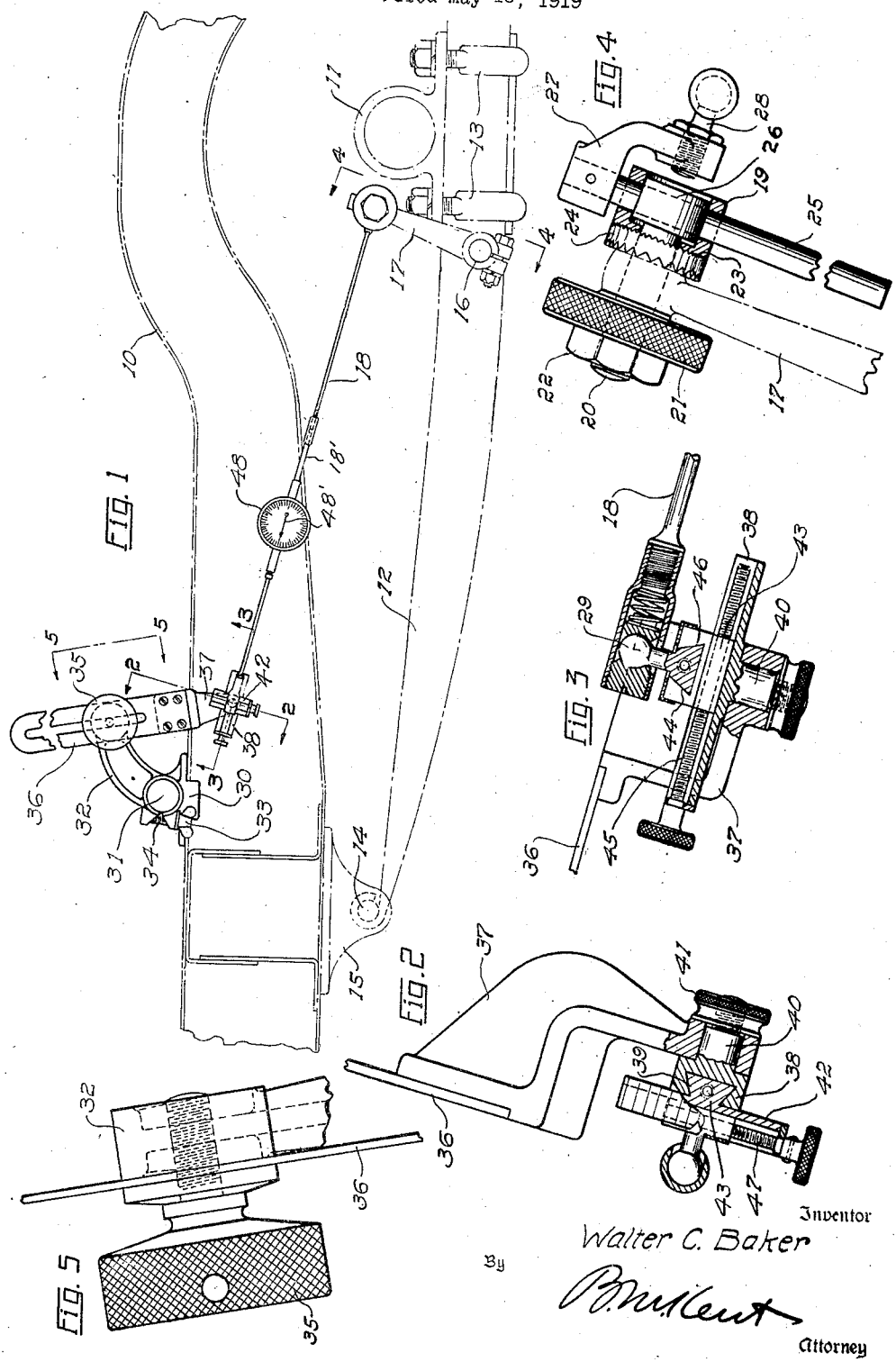

1,587,743

UNITED STATES PATENT OFFICE.

WALTER C. BAKER, OF CLEVELAND, OHIO, ASSIGNOR, BY MESNE ASIGNMENTS, TO THE EATON AXLE & SPRING COMPANY, OF CLEVELAND, OHIO, A CORPORATION OF OHIO.

GAUGING MECHANISM AND METHOD OF USING THE SAME.

Application filed May 19, 1919. Serial No. 298,062.

This invention relates to apparatus for determining the proper position of the levers of a brake actuating mechanism of a motor vehicle.

One of the objects of the invention is to provide an apparatus of the character stated, by which the proper location of the brake levers may be quickly and conveniently determined, and wherein the various movements of the axle, relative to the body, can be taken into account.

Other objects and the features of novelty will be apparent from the following description, taken in connection with the accompanying drawings, in which:—

Figure 1 is a side elevation of an apparatus embodying the invention and shown in its operative relation to the brake mechanism of an automobile;

Figure 2 is an enlarged section on the line 2—2 of Figure 1;

Figure 3 is a similar view on the line 3—3 of Figure 1;

Figure 4 is a fragmentary enlargement of parts as seen from the line 4—4 of Figure 1; and Figure 5 is a similar view of parts as seen from the line 5—5 of Figure 1.

Referring to the drawings, it will be noted that the parts of the motor vehicle are shown in broken lines, in Figure 1, whereas, the apparatus embodying the present invention is illustrated in full lines. The frame of the vehicle is indicated at 10, the axle at 11 and one of the springs at 12, the spring being secured to the axle 11 by the usual clips 13 and having its forward end pivotally connected, as at 14, with a bracket 15 on the frame 10. It will be understood that the relative arrangement of the parts of the motor vehicle, shown in Figure 1, is merely for the purposes of illustration and does not in any way indicate a limitation as to the scope of application of the invention.

On practically all driving axles, as now commercially produced, there is mounted a brake actuating shaft, which is represented in Figure 1 at 16, an illustration of the manner of mounting the shaft being omitted, as it forms no part of the present invention and is well known to those skilled in the art. On the shaft 16, there is usually provided an operating lever or arm 17, which may project upwardly or downwardly from the shaft 16, depending upon the location of the latter, but in the present instance, the arm 17 is indicated as projecting upwardly from the shaft 16.

The arm 17 is usually provided with an eye in its outer end, which serves as a pivotal point of connection for an actuating rod that extends to an actuating lever carried by the frame of the vehicle. This rod usually occupies a position indicated in a general way by the rod 18, in Figure 1, the rod 18 being, however, a part of the apparatus about to be described.

In a motor vehicle, the body, which will be mounted on the frame 10, has up and down movements relative to the axle, due to road conditions and the deflections of the springs. In the case of a vehicle in which the drive or propelling force is transmitted from the axle to the frame wholly through the springs 12, the axle will move or oscillate, relative to the body, in a curved path, approximately the arc of a circle, about an axis in the vicinity of the pivot 14, as the body moves up and down, due to varying road conditions. If the driving and braking torque in the axle are also taken entirely by the springs, these forces will result in deflections in the springs, which permit the axle to oscillate about an axis parallel with its own axis, but slightly removed therefrom. In cases where the torque in the axle is taken by what is known as a torque-member, the character of the oscillations will be determined by the torque-member.

It will be understood that the lever 17, being carried by the axle, will be affected by all of the movements of the latter, and, therefore, if the forward end of the rod, which has its rear end connected to the lever 17, is not located approximately at the center about which the axle oscillates, as the body and frame 10 move up and down, the lever 17 will be moved back and forth and actuate the shaft 16 so as to tend to either move the brake control lever on the body or set or release the brakes, or, in any event, disturb the normal operation of the brakes. It is, therefore, important that the forward end of this rod be located approximately at the said center of oscillation. The oscillations of the axle, due to the driving and braking torque, make it necessary that the point of connection between the lever 17 and its actuating rod, should be approximately at the center of this oscillation, and it is the object of the present invention to provide apparatus for determining the most nearly correct positions for the ends of the rod which actuates the lever 17.

There is secured on the outer end of the lever 17 a block 19, which is clamped against the lever 17 by means of a bolt 20 and the thumb nut 21, the latter being locked in position by the nut 22. The face 23 of the block 19 is serrated, as indicated in Figure 4, to cooperate with a similarly serrated washer 24, which engages the side of the lever 17 and holds the parts against turning thereon. The head of the bolt 20 is arranged in a socket in the block 19 and has a transverse opening 26 which alines with openings in the block 19 and through which openings the rod 25 passes, the arrangement clamping the rod when the nut 21 is tightened. The rod 25, when unclamped, is slidable to different positions in the block 19 and carries on one end an arm 27 on which is a pivot 28, the arm 27 being so formed that the pivot 28 may be universally adjusted in a plane about the axis of the block 19, which, in this case, is the eye or pivot point at the end of the lever 17.

The rod 18 has one end attached to the pivot 28, the method of attachment being similar to that used at the forward end of the rod and illustrated in Figure 3 as constituting the connection with the pivot 29. It will be noted that the pivots 28 and 29 have ball ends, for the purpose of permitting universal adjustment of the ends of the rod 18 thereon, within a limited range.

A bracket 30 is secured to the frame 10 and carries a horizontal pivot 31 on which an arm 32 is adjustably mounted, this arm having a split hub adapted to be clamped on the pivot 31, by means of the nut 33 and bolt 34. The arm 32 carries a thumb screw 35 (see Figure 5), which is adapted to secure the slotted arm 36 in any desired position to which it may be adjusted. The lower end of the arm 36 carries an offset bracket 37 and the latter carries a member 38 having a dove tail slot 39 therein, the member 38 being adjustable in the bracket 37 on its pivot 40 and secured by means of the thumb nut 41. A member 42 having a dove tail projection 43 fitting the slot 39 and provided with a dove tail slot 44 arranged at right angles to the slot 39, is adjustable along the slot 39, by means of the screw 45. There is slidable, in the slot 44, a block 46, which may be accurately adjusted by means of the screw 47. The block 46 carries the pivot 29, and, from Figures 1, 2 and 3, it will be apparent that the pivot 29 may be very finely adjusted to almost any position within the range of movement of the parts in the slots 39 and 44, by the screws 45 and 47. Desired adjustments of the pivot 29 beyond the range of movement of the parts in these slots may be effected by varying the position of either or both of the arms 32 or 36.

The rod 18 is made in two parts one of which is attached to the casing of the instrument 48, the other part of the rod 18 being connected with a plunger 18' which is movable in the casing of the instrument 48 and operatively connected with a hand 48' to rotate the latter so that the position of the plunger will be indicated on the dial of the instrument 48. In other words, the instrument 48 permits the rod 18 to lengthen or shorten, as may be necessary, and the hand 48' will indicate such lengthening or shortening. The device 48 is known as an extensometer and is a common commercial product that may be obtained in the open market and, therefore, a description of its mechanism is unnecessary.

The purpose of the apparatus is to so locate the pivots 28 and 29 as to allow the various movements of the axle 11, relative to the body, without producing oscillations in the shaft 16, and, consequently, without disturbing the action of the brakes. In using the apparatus, the parts are first set up with the pivot 28 located in some position which is assumed to be as nearly correct as can be determined by estimate. The pivot 29 is similarly located, and, to determine the proper location for the pivot 28, the axle is oscillated by means of a long lever securely clamped thereto, or in any other convenient manner, the position of the pivot 28 being, in the meantime, adjusted until a position is found wherein the oscillations of the axle have practically no effect on the instrument 48. This location of the pivot 28 will be approximately the proper point for the location of the eye of the lever 17.

With the pivot 28 securely held in the position determined, as above, the frame 10 is then moved up and down, by means of a suitable load applied thereon and hoisting apparatus to lift the load, and the position of the pivot 29 adjusted until the movements of the frame produce practically no effect on the instrument 48. This location of the pivot 29 will be the practically correct position for the forward end of the rod which actuates the lever 17. With the ends of the rod positioned, as thus determined, neither the oscillations of the axle due to torque nor the up and down movements of the body will produce any objectionable effect on the brake mechanism.

While I have illustrated and described an apparatus embodying the principles of my invention, it will be understood that the invention is not limited to this particular apparatus and that the scope of the invention is to be determined by the claims appended hereto.

Having thus described my invention, what I claim is:

1. In apparatus of the class described, the combination of means adapted to be attached to a movable part, the correct position of which is to be determined, a pivot on said means, means for adjusting said pivot to different positions with relation to said part, a pivot adapted to be arranged on a member relative to which said part has movement, a connection between said pivots, and means in said connection for indicating variations in the distance between said pivots due to relative movements of said part and said member.

2. In apparatus of the class described, the combination of a member adapted to be attached to a movable part, the correct position of which is to be determined, a pivot, adjustable means for supporting said pivot on said member and whereby said pivot may be universally adjusted in a plane, a pivot adapted to be arranged on a member relative to which said part has movement, and an extensible connection between said pivots including means for indicating the variations in length of said connection due to relative movements of said part and the last mentioned member.

3. The method of determining the proper location of the brake-lever pivot of a motor vehicle, which has an axle connected with the vehicle frame through a spring and a brake-lever pivoted to partake of the bodily movement of the axle, which method consists in providing said lever near its free end with an adjustable pivot, turning said axle by applying torque repeatedly thereto and determining the resulting variations in the distance between said pivot and a fixed point on said frame, and meanwhile adjusting said pivot on said lever until the variation is reduced to a minimum.

4. The method of determining the proper location of one of the pivots of the brake-lever operating-mechanism of a motor vehicle, which has an axle connected to the vehicle frame through a spring and a brake lever so pivoted as to partake of the bodily movement of the axle, the lever having a pivot near its free end, which method consists in providing the frame with an adjustable pivot, pressing the frame repeatedly towards the axle and determining the resulting variations in the distance between said pivots on the frame and lever respectively, and meanwhile adjusting said pivot on said frame until the variation is a minimum.

5. The method of determining the proper location of the pivot connections of the brake-operating mechanism of a motor vehicle, which has an axle connected to the vehicle frame through a spring and a brake lever so pivoted as to partake of the bodily movement of the axle, which method consists in providing said lever and frame each with an adjustable pivot, turning the axle by applying torque repeatedly thereto and determining the resulting variations in the distance between said pivots on the frame and lever respectively, and meanwhile adjusting said pivot on said lever until such variation is a minimum, repeatedly pressing the frame towards the axle and again determining the resulting variations in the distance between said pivots and meanwhile adjusting the pivot on the frame until the variation is again a minimum.

In testimony whereof I affix my signature.

WALTER C. BAKER.